United States Patent [19]

Wagner et al.

[11] Patent Number: 4,510,350

[45] Date of Patent: Apr. 9, 1985

[54] PERSONAL ALARM APPARATUS INCLUDING WRIST SUPPORTED TRANSMITTER AND RECEIVER/TELEPHONE INTERFACE CIRCUIT

[75] Inventors: Peter Wagner; Victor Shkawrytko, both of Winnipeg, Canada

[73] Assignee: Almicro Electronics Inc., Winnipeg, Canada

[21] Appl. No.: 472,759

[22] Filed: Mar. 7, 1983

[30] Foreign Application Priority Data

Mar. 11, 1982 [GB] United Kingdom ............... 8207192

[51] Int. Cl.³ .......................................... H04M 11/04
[52] U.S. Cl. .................................................... 179/5 P
[58] Field of Search ...................... 179/5 R, 5 P, 90 B, 179/6.12, 6.02, 2 A

[56] References Cited

U.S. PATENT DOCUMENTS

| | | | |
|---|---|---|---|
| 3,598,919 | 8/1971 | Lott | 179/5 P |
| 3,786,501 | 1/1974 | Marnerakis | 179/5 R X |
| 3,842,208 | 10/1974 | Paraskevakos | 179/5 R |
| 3,925,622 | 12/1975 | Robinson | 179/5 P X |
| 4,049,916 | 9/1977 | Danner | 179/6.16 X |
| 4,051,327 | 9/1977 | Rigsby | 179/5 R |
| 4,338,493 | 7/1982 | Stenhuis et al. | 179/5 R |
| 4,371,751 | 2/1983 | Hilligoss, Jr. et al. | 179/5 R |
| 4,442,320 | 4/1984 | James et al. | 179/5 R |

FOREIGN PATENT DOCUMENTS 2051520 1/1981 United Kingdom ............... 179/5 R

OTHER PUBLICATIONS

Weaver D. Weed, "At the Touch of a Button, Transmitter Sends a Call for Help," vol. 200, *Telephony*, No. 13, Mar. 30, 1981, pp. 24-25.
*Tel-Aid Emergency Call System;* Sales Brochure, Metro Tel Corp., Syosset, N.Y.
*Telephony*, May 24, 1982, p. 140, "Plant Man's Notebook" edited by Ray Blain.

*Primary Examiner*—Keith E. George
*Attorney, Agent, or Firm*—Stanley G. Ade

[57] ABSTRACT

A personal alarm apparatus comprises a wrist mounted R.F. transmitter including a push button trigger and a relay station connected to the telephone line. The relay station on receipt of the transmitted alarm signal dials the first of up to four stored telephone numbers and repeats a digitized vocal message. The relay station includes means for sensing a touch-tone on the line to cease the message and a ring-tone sensor for counting rings in a call-back before intercepting the call and further repeating the message.

7 Claims, 5 Drawing Figures

PERSONAL ALARM APPARATUS INCLUDING WRIST SUPPORTED TRANSMITTER AND RECEIVER/TELEPHONE INTERFACE CIRCUIT

BACKGROUND OF THE INVENTION

This invention relates to personal alarm apparatus and particularly to the type which can be carried on the person by an infirm or elderly patient for calling assistance in an emergency.

Elderly and infirm people often prefer to live independent lives in their own homes rather than to live in a controlled environment available in various institutions. Such an arrangement is satisfactory for all concerned, but there is the danger that the elderly or infirm person can become incapacitated by an accident or sudden illness attack leaving them unable to summon assistance. The person can therefore remain in a serious state for some time until visited by a friend or relation. This can sometimes have disastrous consequences.

Various noise alarms have been available for many years but these are necessarily limited in range and hence cannot be used to summon trained assistance or the particularly caring assistance of a close friend or rela- tive.

SUMMARY OF THE INVENTION

It is one object of the invention therefore to provide a personal alarm apparatus which is readily portable and yet can be used to summon assistance from a remote location.

Accordingly, a personal alarm apparatus comprising an alarm signalling device having a casing adapted for ready transport on the person, a manually operable switch mounted on the casing and a transmitter responsive to operation of the switch for transmitting a radio frequency alarm signal, and a relay station mounted within a single housing and comprising means responsive to the alarm signal, means for connection to a telephone line, means for dialling telephone numbers on said line, a memory and means for storing in said memory a plurality of telephone numbers with an order of priority whereby said dialling means can dial each of said numbers in turn.

It is one advantage of the invention therefore that the signalling device is readily portable and can comprise a wrist borne device similar to a wrist watch and yet can communicate via the telephone lines to any remote location.

It is an important feature of the invention that the relay station stores a plurality of telephone numbers which can be dialled in order of priority to call various individuals rather than a central impersonal station.

Furthermore, the relay station can include a system of playing a recorded message to the chosen recipient which message can be repeated several times and the repetition can be stopped by a tone signal issued by the recipient to save time. The relay station can also include a system for confirming the accuracy of the alarm signal by repeating the message when called back by the recipient. The relay station can be programmed to await a certain number of rings of the telephone from the callback in order to give time for the person making the alarm to personally answer the telephone, if physically able to do so.

With the foregoing in view, and other advantages as will become apparent to those skilled in the art to which this invention relates as this specification proceeds, the invention is herein described by reference to the accompanying drawings forming a part hereof, which includes a description of the best mode known to the applicants and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 3:
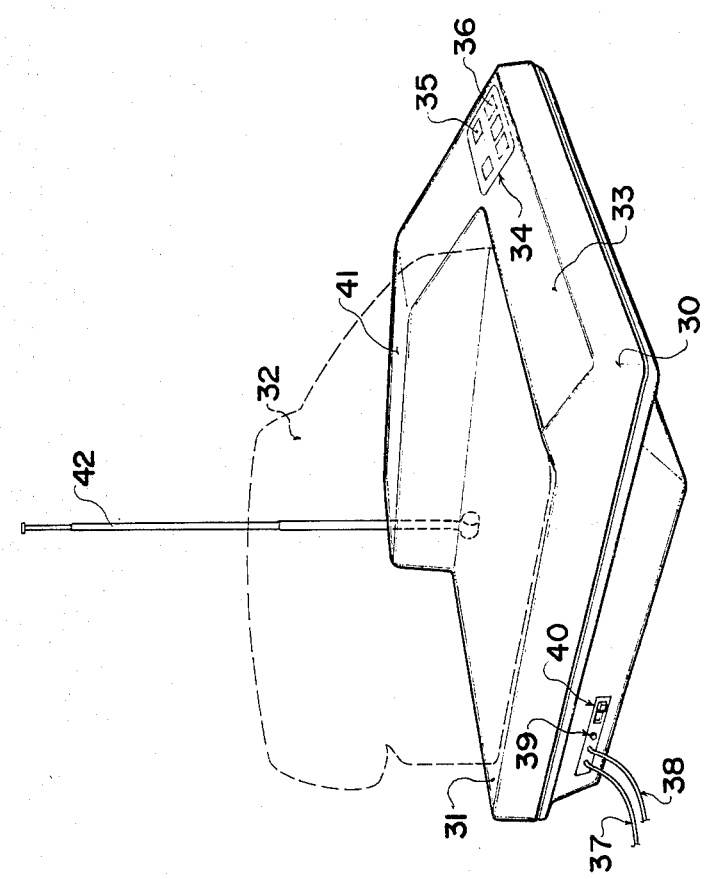
FIG. 3 is an isometric view of the exterior of the relay station for use with the alarm signalling device of FIGS. 1 and 2.
Figure 1:
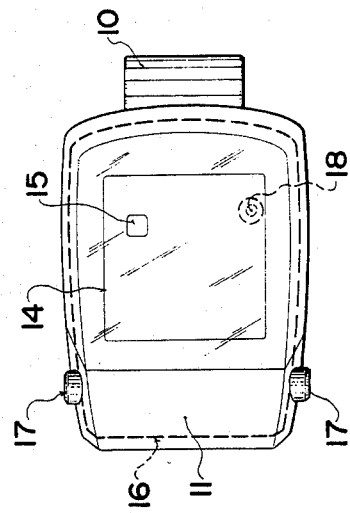
FIG. 1 is a plan view of a wrist-borne alarm signalling device.
Figure 2:
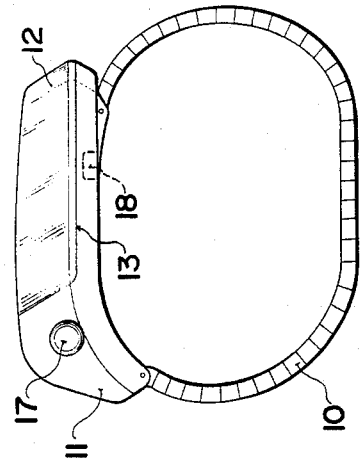
FIG. 2 is a side elevational view of the alarm signalling device of FIG. 1.
Figure 4:
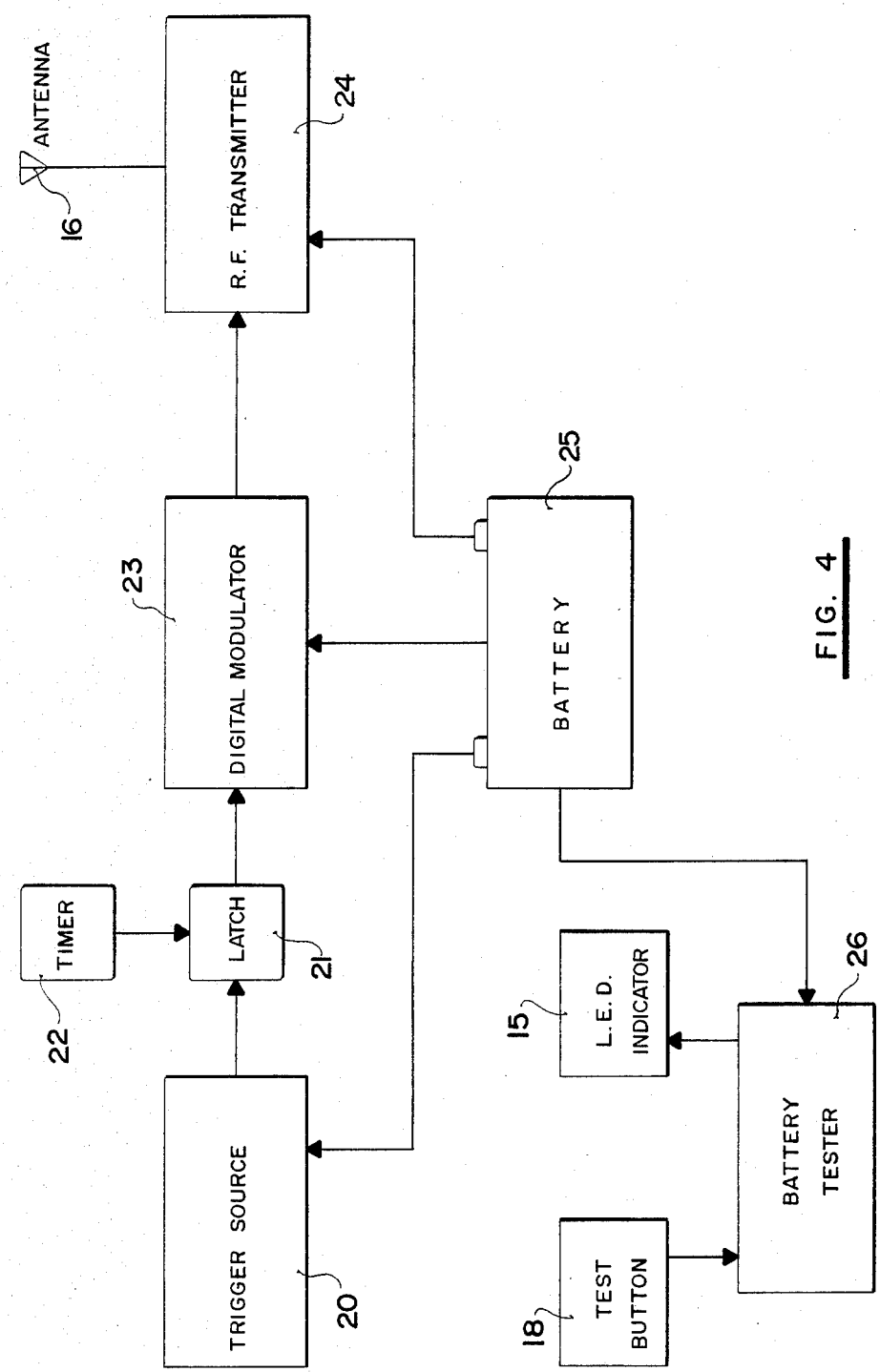
FIG. 4 is a schematic block diagram of the components of the relay station of FIG. 3.
Figure 5:
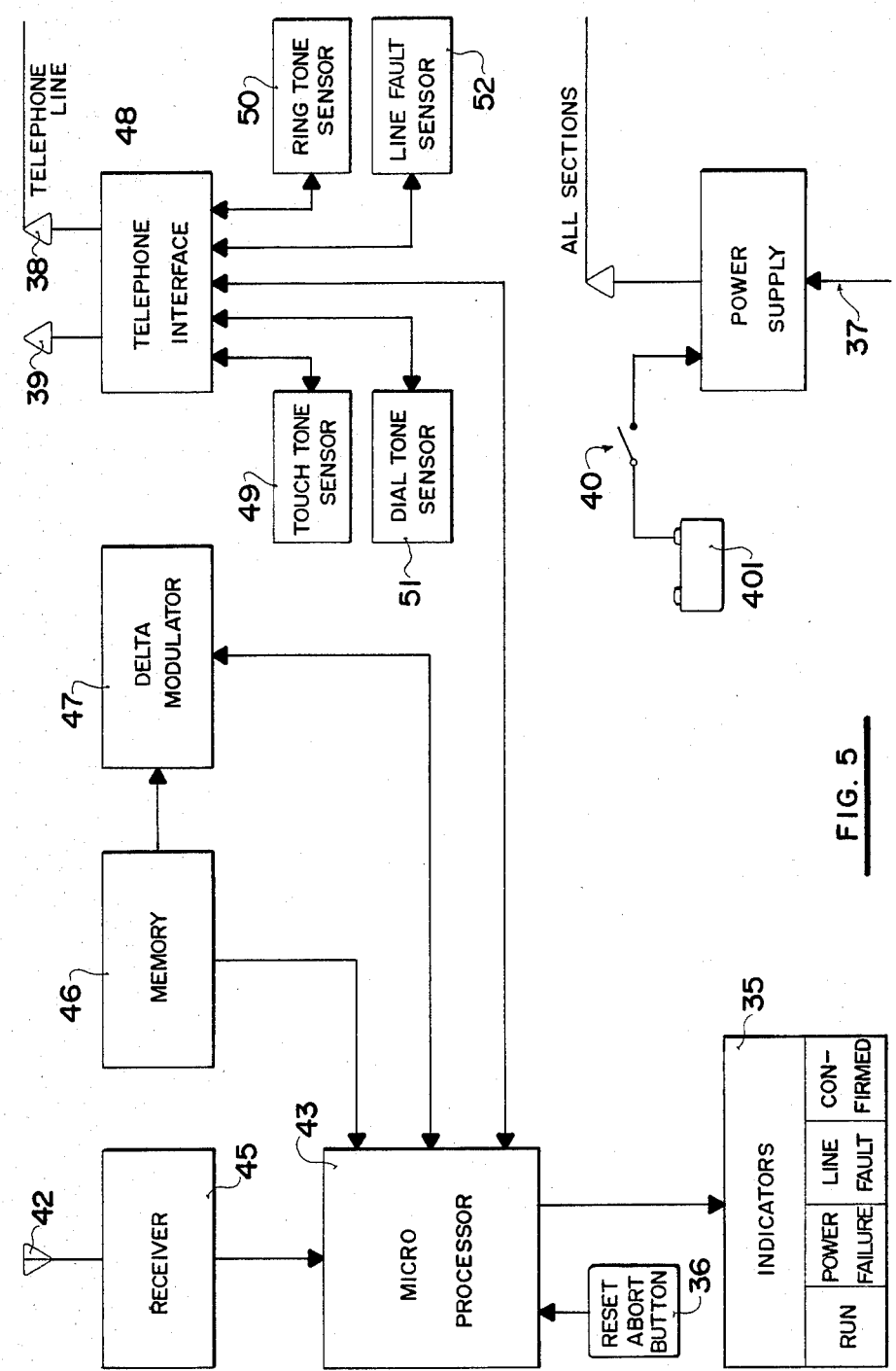
FIG. 5 is a block diagram of the relay station.

Generally, the apparatus comprises an alarm signalling device shown in FIGS. 1, 2 and 4 and a relay station shown in FIGS. 3 and 5 connected to a telephone line also connected to a standard handset as shown also in FIG. 3.

Turning firstly to the alarm signalling device, this is mounted in a small plastic casing which is suitably formed to be carried on the wrist of the elderly or infirm patient and including a wrist band 10 connected in a conventional manner to a casing base 11 both of which may be of plastic material so as to avoid draining some of the power of the transmitter. The casing also includes a cover 12 which can be slid away from the base along the junction line 13 to expose the electronic components mounted within the casing and shown schematically at 14. The cover 12 is of a translucent "smoked" plastic material which provides a pleasing appearance while effectively hiding the electronic components and yet allowing light from a light emitting diode 15 to be visible through the cover when illuminated. The cover 12 and casing 11 slide into snap fitting engagement thus providing a complete, simply manufactured plastic casing which is pleasing in appearance and resistant to damage.

Around the bottom of the casing 11 is mounted an antenna 16 for transmitting a radio frequency signal developed by the components as will be explained hereinafter. In addition, the housing 11 mounts a pair of buttons 17 which can be depressed to trigger the components to transmit the signal. Finally, the casing mounts a battery test button underneath the casing in a recess so that it is not normally visible to view, but can be operated to determine if the batteries are satisfactory.

Turning now to FIG. 4, the internal electronic components are shown schematically and comprise a trigger source 20 operated by simultaneous depression of the buttons 17 so triggering operation of the device. The trigger source communicates with a latch 21 which acts to latch the trigger regardless of the period of time for which the buttons 17 are depressed so that they can be released and still maintain the transmitter triggered. A timer 22 acts to control the latch so that the triggering of the transmitter can be released after a predetermined time to avoid interfering with local equipment by the R.F. signal transmitted.

The latch circuit 21 acts to initiate the transmission of a digitally modulated code signal from a digital modulator 23. The digital modulator 23 is coded with a particular code indicative of the transmitter concerned and can provide 16,000 different codes so that each of 16,000 different transmitters has its own unique code so that the possibility of the same code being transmitted by a transmitter within the vicinity is very small. The modulated signal is passed to an R.F. transmitter 24 which transmits the signal through the antenna 16 in the casing 11.

The trigger source 20, digital modulator 23 and transmitter 24 are all powered from a battery 25 of conventional type suitable for mounting in a wrist-born device of the type concerned. A circuit for testing the battery to ensure that it is in satisfactory condition is provided at 26 and includes the LED indicator 15 and also the test button 18 from FIG. 1. The battery test circuit acts to apply a load to the battery similar to the transmitter circuit and to pass the current through the LED 15 so that it is illuminated to indicate a satisfactory condition of the battery. To prevent the battery from being drained, the battery test circuit acts to apply the load only instantaneously to flash the LED 15 regardless of the period of time of depression of the test button 18.

The relay station shown in FIGS. 3 and 5 comprises an outside casing 30 providing a flat platform 31 for receiving a conventional telephone handset 32. An inclined front face 33 of the outer casing includes an indicator panel 34 having four LED indicator lights 35 and a touch button 36 behind a "dead face" black panel. The indicators as shown in FIG. 5 and explained in more detail hereinafter include the legends "run", "power failure", "line fault" and "confirmed".

The touch button 36 includes the legend "reset/abort".

At the bottom of the casing 30 adjacent the rear is provided the inlet leads to the base station comprising a power line 37, a telephone line 38 including a plug for connection to the telephone line running into the building in which the base station is located and a receptacle 39 for receiving the telephone line from the handset 32. In addition, there is provided a battery switch 40 for connecting into the power supply circuit a battery housed in a battery housing 41.

The casing 30 also supports an antenna shown in FIGS. 3 and 5 at 42, mounted on the rear of the casing.

The components shown in FIG. 5 are housed in the casing 30 and comprise a microprocessor 43 connected variously to a receiver 45 which receives the signal from the transmitter connected by the antenna 42. The microprocessor is also connected to a memory 46 comprising three EPROMs, to a delta modulator 47 and to a telephone interface 48 connected to the telephone line at 38 and to the telephone handset at 39. The telephone interface includes a sensor 49 responsive to the touch-tone 9, a sensor 50 responsive to the ring-tone, a sensor 51 responsive to the dial-tone and a sensor 52 responsive to a line fault, as will be explained hereinafter.

The microprocessor is also connected to the indicators 35 and to the reset/abort button 36.

Turning now to the operation of the device, it will be appreciated that the components shown in FIGS. 4 and 5 are indicated only schematically but their construction will be apparent to one skilled in the art from the following description of the operation.

The alarm signal device operates in the VHF or UHF frequency band at a particular frequency to which both the transmitter and the receiver are tuned. When the trigger buttons 17 of the device are operated by the wearer of the wrist band device in an emergency situation, the transmitter acts to transmit a particular digitally modulated code signal at the UHF frequency for the period of time for which the buttons are depressed or for a time period (preferably four seconds) set by the latch 21, with the latch being reset for a further period if the buttons remain depressed for longer than the latch period.

The loop antenna 16 has propogation characteristics that are omnidirectional to the maximum extent practical so as to minimize nulls and to ensure that as far as possible, the antenna 42 receives the signal within a radius of the order of 200 feet from the transmitter. Thus, at any location within the home of the patient or closely outside the home, on the occurrence of an emergency caused by a fall or relapse in the medical condition, the patient can signal to the relay station from the device merely by pressing the buttons 17.

Provided therefore the device is carried at all times, the patient will, in almost all circumstances, be able to summon assistance.

The relay station is preferably located under the telephone or can, in some circumstances, be wall mounted adjacent to the telephone in the home of the patient.

On receipt of a signal at the frequency to which the receiver 45 is tuned, the receiver acts to demodulate the radio frequency signal to obtain the digital signal originating from the digital modulator in the alarm signal device. The receiver also acts to extract a timing synchronization pulse. Both the received digital signal and the timing pulse are then applied by the receiver to the microprocessor 43 where it is compared with a stored code, the same as that held by the digital modulator 23. As explained previously, up to 16,000 different codes can be available in the digital modulator 23 and the microprocessor 43 so that the processor 43 can ensure that it is the corresponding transmitter which is being operated. Any false signals or signals from a different transmitter are therefore ignored. However, a match of the codes causes the microprocessor 43 to commence the alarm signal procedure.

The memory 46 comprises three EPROMs one of which can be programmed to store up to four different telephone numbers, each of up to fourteen digits, of persons or agencies the patient wishes to contact in the event of the emergency. The programming of the EPROM can only be carried out by the manufacturer or distributor using microprocessor equipment. A signal indicative of a voice message which the patient wishes to have communicated to the party concerned in the event of the emergency is stored in the memory 46 generally in the second EPROM. Again, the voice message can only be stored in the EPROM by the manufacturer or distributor and can be changed when circumstances change such as when the patient moves to a different location either temporarily or permanently. The third EPROM stores the software necessary for the microprocessor and is generally unchanged.

Upon a match of the received and stored codes, the microprocessor 43 reads the first EPROM to obtain the first telephone number listed in an order of priority.

The microprocessor firstly instructs the telephone interface 48 to open the telephone line 38. The line fault sensor 52 is responsive to voltages and current on the line which, as is well known, vary from the battery supply voltage from the exchange when the line is connected to an extension handset. The sensor 52 is therefore responsive to the connection of the telephone line to an extension and in this condition the microprocessor 43 acts to transfer the signal in the second EPROM through the delta modulator 47 to re-constitute the vocal message for transmission to the extension and to the telephone line through the telephone interface 48. Thus, any one on an extension is immediately instructed of the emergency. If they are not in a position to assist, they need only to clear the line to allow the relay station to call the chosen recipient.

The sensor 51 is responsive to the commencement of the dial-tone on the line to instruct the microprocessor to supply signals to the line dialling the telephone number concerned. In the absence of a sensed dialtone, the interface 48 hangs up the telephone for a second and third attempt. On a third failure, the microprocessor 43 over rules the dial-tone sensor and acts to dial the telephone number after a delay period.

After dialling is completed, the microprocessor 43 acts to transfer the signal in the second EPROM through the delta modulator 47 to re-constitute the vocal message for transmission on the telephone line through the telephone interface 48. The microprocessor is programmed to repeat the message continuously for a specific time controlled by the program in the third EPROM.

The recipient of the telephone call can terminate the repetitions by providing a touch-tone 9 signal either by pressing the touch-tone button 9 of the telephone handset or by a touch-tone 9 generator supplied to the recipient, which tone is sensed by the sensor 49 to instruct the microprocessor to cease the repetition. It will be appreciated that considerable time can be saved by cessation of the repetition to ensure that help is issued as quickly as possible. The microprocessor 43 looks for the touchtone 9 signal during pauses in the vocal message and at the end of the message when the repetition is ceased by receipt of the touch-tone 9, the telephone interface is instructed to hang up the line and await a call-back from the recipient of the telephone call.

The recipient is instructed that he must check the validity of the alarm call by phoning back to the relay station. The call-back is sensed by the ring-tone sensor 50 with the microprocessor 43 programmed to count a predetermined number of rings and then to instruct the telephone interface 48 to connect to the line 38 (lift the line off the hook). Immediately, the microprocessor acts to repeat the voice message once on the telephone line to confirm that this particular base station has the alarm condition and then hangs up. It will be appreciated that in the event of a false alarm or an alarm which is of a reduced emergency nature, the patient could intercept the call-back to inform the call recipient of the circumstances. In the event that the call-back goes to the wrong number in error, this will be appreciated even if there is no reply by the fact that the message is not repeated. Significant time is saved by the fact that the call recipient can cancel the repetition of the message by issuing the touch-tone 9 and then can rapidly confirm the validity of the alarm signal by calling back and receiving the repeated message. In this way, a reasonable check is made to avoid false alarms while avoiding substantial delay before the help is issued.

The use of the dial-tone sensor 51 to confirm the commencement of dialling signals, avoids the necessity for waiting for a period of time sufficient to guarantee the commencement of the dial-tone. However, the difficulty of sensing different dial-tones and the possibility of component failure means that it is desirable to overrule the dial-tone sensor after a third attempt.

In the event that a third party is telephoning in on the telephone line 38 at the time that the interface requires the line for the emergency call or in the event that a third party calls in on the line while the interface is waiting after hanging up, the microprocessor 43 is programmed, after sensing the ring-tone from the sensor 50, to transmit the voice message once thus informing the third party and expecting the third party to hang up the line in view of the emergency situation. Furthermore, if a third party intervenes before the chosen first recipient can make the call-back, the message is repeated firstly to the third party and then by virtue of the above provision, to the chosen recipient when he finally makes his connection.

Following completion of a call and call-back cycle to the first telephone number, further telephone numbers can be called up to a total of four such numbers in the order of priority selected by the storage in the first EPROM. In the event that the first number does not respond to the message by issuing the touch-tone 9 and making the necessary call-back, the microprocessor proceeds to the second number in the priority. The microprocessor repeats the sequence of the first followed by the second number, three times and then moves to the third and fourth priority numbers which are contacted once before reverting to the first number.

In the event that the second number responds by supplying the touch-tone 9 signal, the microprocessor drops this number from the sequence and continues to repeat three attempts of the first number followed by one attempt of the third and fourth number. The microprocessor does not wait for a call-back from the second priority number or from the third and fourth priority numbers.

In the event that the first priority number responds, the microprocessor will only make an attempt once at the third and fourth numbers, with the repeating sequence only being instituted if the first number fails to respond.

In the event that the first priority recipient fails to make the call-back due to error or improper instruction, the microprocessor is arranged to wait for a period of time controlled by the software program and then to repeat the sequence to the number concerned.

While the base station is waiting for the signal from the transmitter, the microprocessor acts to regularly check, through the interface 48, the proper working of the telephone line 38. This can be done by either taking the line off the hook and detecting the dial-tone by the sensor 51, or by the sensor 52 reacting to the presence of the exchange battery voltage on the line, or alternatively, the proper voltage and current of the connection of the line to an extension phone. The latter can be effected without taking the line off the hook. In the event that a fault is detected, the warning light "line fault" is illuminated to warn the patient and a mild alarm sound is issued to summon the patient's attention.

Similary, the power source from the 115-volt power supply on the line 37 is continually monitored and upon detection of its failure, a substitute supply from the battery indicated at 401 is connected. A warning light "power failure" is illuminated and the warning sound issued to inform the patient.

During normal standby operation of the base station, the "run" light is pulsed to confirm that the device is operating properly. On receipt of valid alarm signal from the transmitter, the "run" light is illuminated continuously indicating that the microprocessor is operating to carry out the calling sequences stated above.

On completion of the calling sequences, the "confirmed" light is illuminated to inform the patient that the first chosen recipient has been properly informed and calls have been made to the other recipients.

In the event of the patient operating the transmitter inadvertently, the calling sequence initiated by the microprocessor can be cancelled by pressing the "reset-/abort" button 36. Thus, resetting the microprocessor in its initial condition awaiting a signal from the transmitter.

It will be appreciated therefore that the transmitter and relay station together with the telephone line provides a self-sufficient apparatus for signalling an alarm condition to any chosen recipient. The transmitter is readily portable by the patient and hence can be available at all times. There is no requirement for the alarm signal to pass through a central station or through a third party and hence it is directly and accurately communicated to the chosen recipient without the possibility for an error or delay through the third party. Furthermore, the accuracy of the alarm signal can be readily and quickly checked by a call-back to the alarm station and the repeat of the alarm message.

Since various modifications can be made in our invention as hereinabove described, and many apparently widely different embodiments of the same made within the spirit and scope of the claims without departing from such spirit and scope, it is intended that all matter contained in the accompanying specification shall be interpreted as illustrative only and not in a limiting sense.

What we claim as our invention:

1. A personal alarm apparatus comprising an alarm signalling device having a casing and strap adapted for ready transport on the wrist of the person, a manually operable switch mounted on the casing and a transmitter responsive to operation of the switch for transmitting a radio frequency alarm signal, and a relay station mounted within a single housing and comprising means responsive to the alarm signal, interface means for connection to a telephone line, means for opening said line and dialling telephone numbers on said line, a memory, means for storing in said memory a plurality of telephone numbers with an order of priority whereby said dialling means can dial each of said numbers in turn, means for transmitting a repeated message on said line and means responsive to a signal on the line for ceasing said message, said interface means comprising;
  means responsive to a dial tone on said line and arranged such that on detection of said dial tone said numbers are dialled and on failure to detect said dial tone said line is hung up and on three failures to so detect said dial tone said numbers are dialled,
  means to detect an extension phone on said line off hook and arranged to actuate said transmitting means in response thereto,
  means responsive to a ring tone on said line and arranged on receipt of a ring tone at any time subsequent to an alarm signal to actuate said transmitting means, and means for counting ring tone up to a predetermined number before actuating said transmitting means, and
  means for repeatedly checking for a line fault and for indicating a fault when detected.

2. Apparatus according to claim 1 wherein said means responsive to said signal on the line is responsive to a tone generated on the line by a tone button of a conventional telephone handset.

3. Apparatus according to claim 1 including means activated by said signal on the line for hanging up said line and means for waiting a predetermined period of time for a call-back.

4. Apparatus according to claim 1 wherein the switch can be operated and released including latch means responsive to operation of said switch to latch the transmitter for a period of time independent of release of said switch.

5. Apparatus according to claim 1 including means for developing a digital modulated code signal for transmission by said transmitter as said alarm signal.

6. Apparatus according to claim 5 wherein said relay station includes means responsive to said digital code.

7. Apparatus according to claim 1 wherein said dialling means is arranged to dial each of said numbers in sequence, to move on to the next number on failure to obtain a response and to revert to the highest priority number repeatedly after dialling each number in sequence.

* * * * *